March 17, 1970 J. N. LIND ET AL 3,501,706

BROADBAND MICROWAVE PARAMETRIC AMPLIFIER

Filed Feb. 20, 1967 3 Sheets-Sheet 1

INVENTORS
JAMES N. LIND
WILLIAM E. MEYER
BY
Howard A. Silber
ATTORNEY

INVENTORS
JAMES N. LIND
WILLIAM E. MEYER
BY
Howard A. Silber
ATTORNEY

INVENTORS
JAMES N. LIND
WILLIAM E. MEYER
BY Howard A. Silber
ATTORNEY 3,501,706
Patented Mar. 17, 1970

3,501,706

BROADBAND MICROWAVE PARAMETRIC AMPLIFIER

James N. Lind, Costa Mesa, and William E. Meyer, Buena Park, Calif., assignors to North American Rockwell Corporation, a corporation of Delaware Filed Feb. 20, 1967, Ser. No. 617,231
Int. Cl. H03f *7/04*
U.S. Cl. 330—4.9 7 Claims

ABSTRACT OF THE DISCLOSURE

A broadband microwave parametric amplifier is described which uses a varactor diode as the nonlinear reactance to couple pump energy at a high frequency to a signal at a much lower frequency. The varactor diode is situated in a novel waveguide structure comprising a rectangular waveguide of sufficient width to allow propagation of the signal in the lowest order transverse electric mode. A pair of substantially U-shaped channels oppositely extend from the top and bottom of the waveguide to a depth of one-quarter guide wavelength at the lower idler frequency. The channels define a pseudo-cavity region in the waveguide, within which region the idler and pump energy is constrained and parametric interaction occurs.

BACKROUND OF THE INVENTION

Field of the invention

This invention relates to a broadband microwave parametric amplifier and more particularly to a parametric amplifier utilizing a novel rectangular waveguide structure having substantially U-shaped channels, extending its top and bottom, forming a pseudo-cavity region in which pump and idler energies may be constrained. The structure facilitates parametric amplification with extremely large percentage bandwidths of microwave signals introduced into the waveguide.

Description of the prior art

The principal factor limiting the sensitivity of microwave receivers is the noise inherent in the device used to amplify such signals prior to their detection. While low noise amplification may be achieved by the use of masers, these devices are restricted in their operation to natural frequencies of the maser material and usually must be operated in a cryogenic environment. A more acceptable approach is to use a parametric amplifier in which energy from an intense pump wave is coupled to the signal by a component exhibiting nonlinear reactance. Parametric amplification provides extremely low noise operation without the need for refrigeration.

Typical prior art microwave parametric amplifiers utilize structures having two adjacent waveguide cavities, one tuned to the signal frequency and a second tuned to the pump frequency. A back-biased diode having nonlinear capacitance, mounted in an aperture in a common wall between the two cavities, reactively couples energy between the pump and signal cavities.

Another typical parametric amplifier structure includes a rectangular waveguide to contain the pump energy. A varactor diode, mounted coaxially in a circular waveguide which intersects one wall of the rectangular guide, serves as the requisite nonlinear reactance. The signal may be introduced into the circular waveguide, and energy may be extracted either at the signal frequency via the circular waveguide or at the idler frequency via the rectangular waveguide.

While the parametric amplifiers described hereinabove may be tunable over a limited frequency range, they are essentially narrowband devices. Prior art broadband parametric amplification has required use of complex mechanical structures. Typical of such devices are the "Coupled-Cavity Travelling-Wave Parametric Amplifiers" described by K. P. Grabowski and R. D. Weglein in the Proceedings of the IRE, volume 48, No. 12, beginning at page 1973. These devices utilize a series of inductively coupled microwave cavities each containing individual signal, idler, and pump resonant chambers and each containing a varactor diode. The cavities are cascaded and pump energy is applied to the diodes in an appropriate phase relationship to allow travelling wave parametric operation. While broadband performance may be achieved, the system is cumbersome mechanically, requires a plurality of cavities, and demands considerable care to maintain the proper pump phase at each varactor diode.

The broadband microwave parametric amplifier which forms the subject matter of this application utilizes a novel waveguide structure having a pseudo-cavity region which permits pump and idler energy to be constrained to a small portion of a waveguide. This structure permits efficient parametric interaction between a signal present in the waveguide at a relatively low frequency and a pump having a considerably higher frequency. The structure is mechanically simple, and when used in a parametric amplifier requires only one reactive element and permits amplification with large percentage bandwidths.

SUMMARY OF THE INVENTION

The inventive broadband microwave parametric amplifier utilizes a novel waveguide structure having a pseudo-cavity region within which the pump and idler energy may be constrained. The structure comprises a rectangular waveguide having a width sufficiently large to support signal energy in the lowest order transverse electric mode. The rectangular waveguide includes substantially U-shaped channels extending from its top and bottom, and terminates in a second waveguide beyond cutoff. The channels, which preferably exhibit a depth of one-quarter-guide wavelength of the lowest idler frequency, define the pseudo-cavity region. The length and width of the region are selected to ensure that both pump and idler energies are constrained and that a maximum electric field occurs at the location of a varactor diode disposed within the region. This varactor diode couples energy from the pump to the signal. The amplified signal may be extracted from the rectangular waveguide utilizing a microwave circulator. Non-degenerate broadband parametric amplification is achieved using a pump frequency much higher than that of the signal.

It is thus an object of this invention to provide a broadband microwave parametric amplifier.

It is another object of this invention to provide a broadband parametric amplifier utilizing a waveguide structure having a pseudo-cavity region for constraining pump and idler energy to a portion only of a waveguide.

It is a further object of this invention to provide a microwave structure including a shorted waveguide containing substantially U-shaped channels extending from the top and bottom of the waveguide to form a pseudo-cavity region capable of containing therein signals substantially above the cutoff frequency of the waveguide.

It is a further object of this invention to provide a microwave broadband parametric amplifier capable of providing amplification with large percentage bandwidths and employing a single varactor diode.

It is yet another object of this invention to provide a microwave broadband parametric amplifier having simple mechanical structure.

Further objects and features of the invention will become apparent from the following description and drawings which are utilized for illustrative purposes only.

DESCRIPTION OF THE PREFERRED EMBODIMENTS

Figure 1:
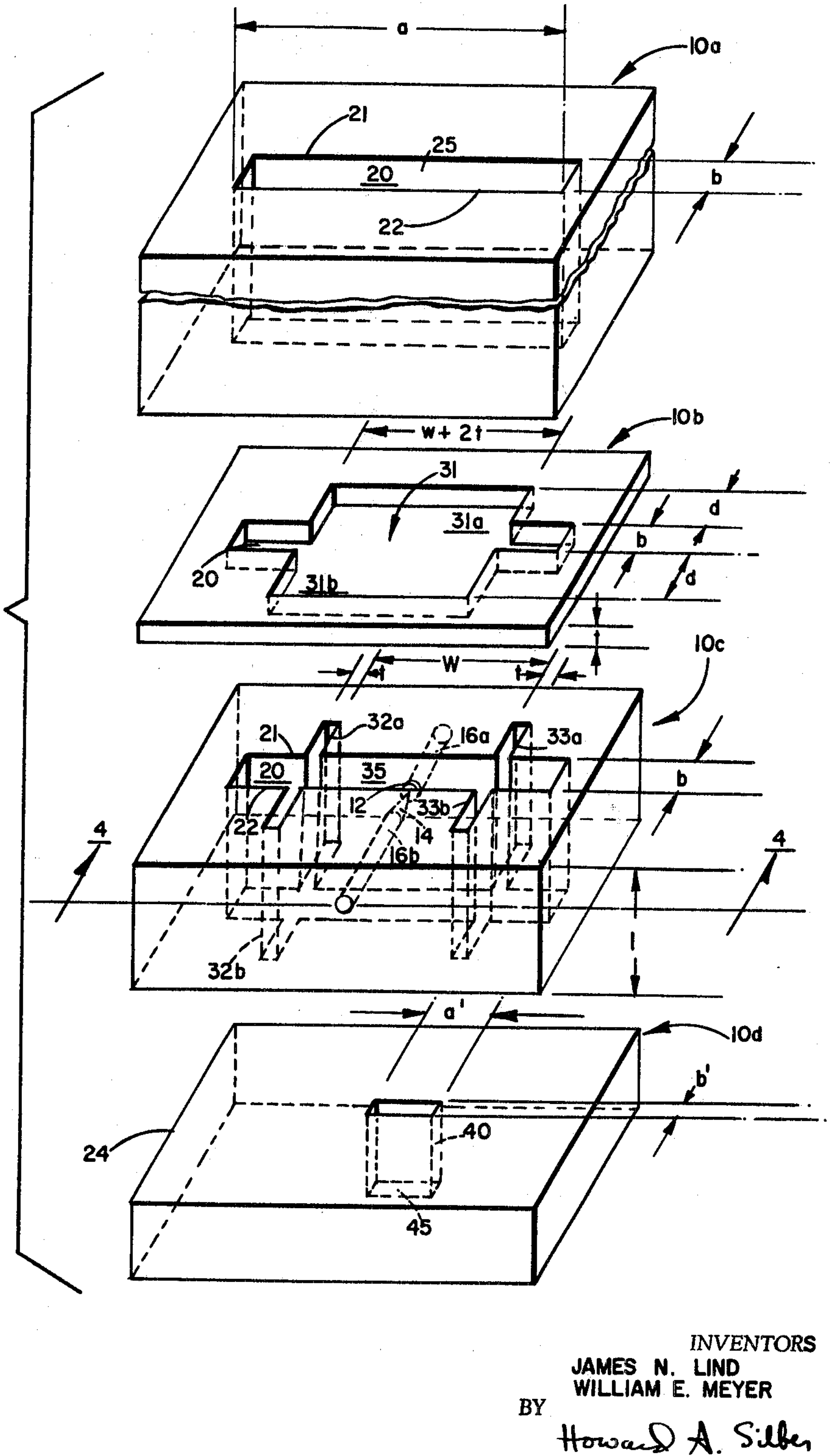
FIG. 1 is an exploded elevation view of the inventive microwave waveguide structure including channels defining a pseudo-cavity region in the waveguide.

The broadband microwave parametric amplifier which forms the subject matter of this application employs the novel waveguide structure illustrated in FIG. 1. The waveguide structure comprises four major sections 10*a*, 10*b*, 10*c*, and 10*d*, which may be assembled into a unitary structure. In a preferred embodiment each of the sections 10*a*, 10*b*, 10*c*, and 10*d* may be milled from a solid block of a metal such as copper having high conductivity. Dowel pins (not shown in the figures) may be used to ensure accurate alignment of the assembled sections. Alternately, the structure may be constructed as a single block for example, by casting. The interior surface of the assembled waveguide structure is illustrated in FIG. 2.

Figure 2:
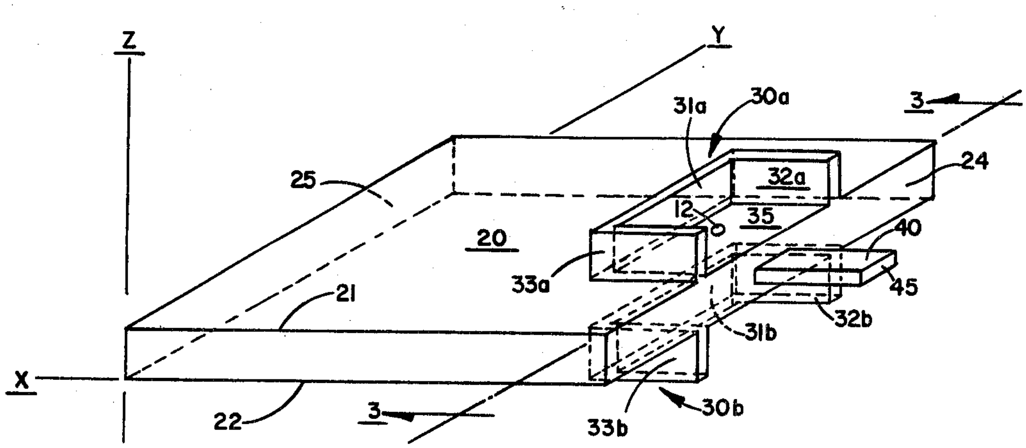
FIG. 2 is an elevation view showing the interior surface of the waveguide structure illustrated in FIG. 1.

As illustrated by FIGS. 1 and 2, the waveguide structure comprises a waveguide section 20 which extends through sections 10*a*, 10*b*, and 10*c*, and which terminates at shorting plane or wall 24 of section 10*d*. A second waveguide 40 having width *a'* and height *b'* also extends from wall 24 and terminates in port 45. The end of waveguide section 20 opposite wall 24 is open and forms port 25. Waveguide section 20 has a width *a* and height *b*, the latter measured between top 21 and bottom 22 of waveguide section 20. As is well known to those skilled in the art, the lowest frequency signal which can be propagated in waveguide section 20 is one whose free space wavelength is equal to 2*a*. Waveguide section 40, whose width *a'* is considerably narrower than *a*, thus has a lowest propagation frequency considerably higher than that of waveguide section 20. Thus wall 24 and waveguide 40 appear as a short circuit termination to a signal propagating in waveguide section 20 in the lowest mode.

Extending respectively from top 21 and bottom 22 of waveguide section 20 are substantially U-shaped channels 30*a* and 30*b*. These channels, which may terminate against wall 24, define pseudo-cavity region 35 of waveguide section 20. Channels 30 and 30*b* respectively comprise end sections 31*a* and 31*b*, first side grooves 32*a* and 32*b*, and second side grooves 33*a* and 33*b*. End sections 31*a* and 31*b* may be constructed by milling a rectangular opening 31 in section 10*b* as illustrated in FIG. 1. Grooves 32 and 33 may be constructed by milling appropriate slots through section 10*c*. In a preferred embodiment, shown most clearly in FIG. 1, the thickness of channels 30*a* and 30*b* is *t*; that is, end sections 31*a* and 31*b*, and side grooves 32 and 33, each have the same thickness *t*. The length and width of pseudo-cavity region 35 are given by *l* and *w* respectively, as shown in FIG. 1. Channels 30*a* and 30*b* each extend to a depth *d* above and below respective waveguide top 21 and bottom 22. Criteria for the selection of the various dimensions *t*, *l*, *w* and *d* are described in detail hereinbelow in conjunction with the operational description of pseudo cavity region 35.

Varactor diode 12 is situated in pseudo-cavity region 35 and may be supplied with a DC bias via a wire introduced through hole 16*b* in block 10*c* (see FIG. 1). A second contact to varactor diode 12 is provided by point contact 14 (not shown in FIG. 2) which extends from bottom 22 of waveguide section 20. Point contact 14 may be fashioned at the end of a metal rod and inserted into hole 16*a* in section 10*b*.

Figure 3:
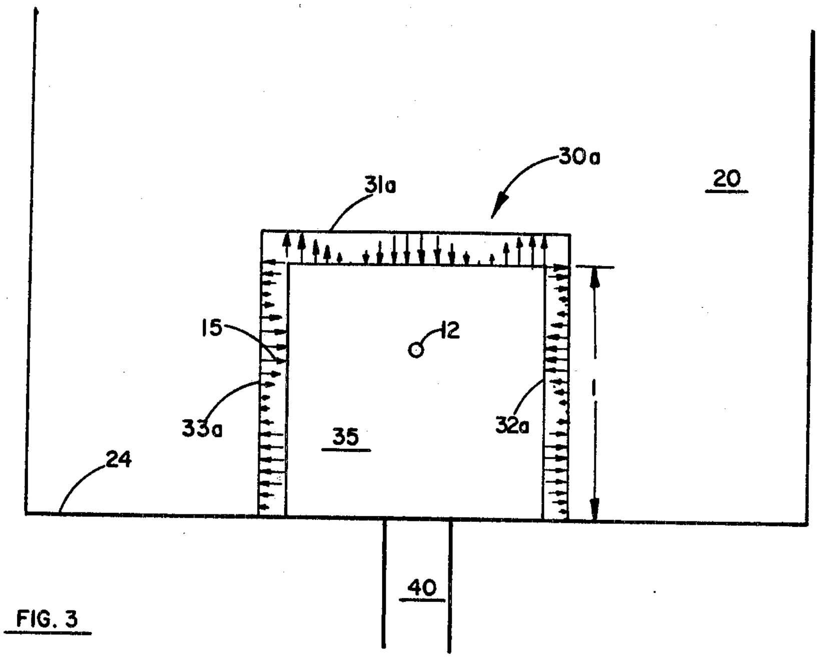
FIG. 3 is a diagram of a possible electric field distribution within the channels of the pseudo-cavity as viewed in a plane generally along the line 3—3 of FIG. 2.
Figure 4:
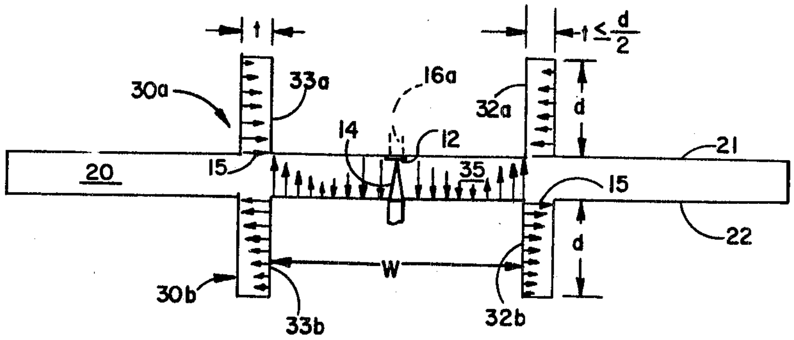
FIG. 4 is a diagram of a possible electric field distribution within a portion of the pseudo-cavity as viewed in a plane generally along the line 4—4 of FIG. 1.

Operation of the pseudo-cavity region 35 defined by substantially U-shaped channel members 30*a* and 30*b* best may be understood by reference to FIGS. 3 and 4, which are viewed respectively along the lines 3—3 of FIG. 2 and 4—4 of FIG. 1. In particular FIGS. 3 and 4 show typical electric field patterns which may be induced in channels 30*a* and 30*b* when these channels are of the preferred dimensions.

In a preferred embodiment, the depth *d* of channels 30*a* and 30*b* essentially is equal to one-quarter guide wavelength of the energy desired to be constrained within pseudo-cavity region 35. For energy introduced in the appropriate mode, this ensures that the electric field (represented by arrows 15 in FIGS. 3 and 4) is a maximum in the planes of top and bottom surfaces 21 and 22 of waveguide section 20. Thus, a wave introduced into pseudo-cavity region 35 (e.g., via waveguide section 40) will see a very high impedance at the periphery of pseudo-cavity region 35 defined by channels 30.

Note that the energy will be constrained to pseudo-cavity region 35 and will not extend out into waveguide section 20 beyond the region defined by substantially U-shaped channels 30*a* and 30*b*. In a preferred embodiment width *w* of pseudo-cavity region 35 essentially is equal to an integral number of one-half guide wavelengths of the signal being constrained. Similiarly the preferred length *l* of pseudo-cavity region 35 is equal to an integral number of one-half guide wavelengths plus one-quarter guide wavelength. These preferred values are illustrated in FIGS. 3 and 4, which show the electric field distribution for energy introduced into pseudo-cavity region 35 in the $TE_{303}$ mode.

Using the configuration of FIGS. 3 and 4, varactor diode 12 may be placed three-quarters of a guide wavelength from wall 24 and midway between grooves 32*a* and 32*b*. As illustrated, this will ensure an electric field maxima at the location of varactor diode 12 for energy introduced into pseudo-cavity region in the $TE_{303}$ mode.

In a preferred embodiment, the groove thickness *t* of channels 30*a* and 30*b* should be less than one-half the depth *d* of grooves 22 and 23. An optimum value for thickness *t* is in the order of one-tenth guide wavelength. A greater thickness *t* may result in the excitation of spurious modes within channels 30*a* and 30*b*, resulting in a significant decrease in the ability to constrain energy to within pseudo-cavity region 35.

Since the thickness *t* is considerably less than the width *a* of waveguide section 20, a relatively low frequency signal introduced into waveguide section 20 will see only a very small inductive perturbation in its field due to the existence of channels 30*a* and 30*b*. Thus a signal of a first relatively low frequency (introduced via port 25) may be present throughout waveguide section 20 at the same time that a wave at a second much higher frequency (introduced by way of port 45 and waveguide 40) may be present only in the pseudo-cavity region 35 of waveguide section 20.

Signals having a one-quarter guide wavelength ($\lambda g/4$) slightly greater, or less than *d* also will be constrained somewhat by channels 30*a* and 30*b* to pseudo-cavity region 35. However, the degree of containment will be slightly reduced from the optimum value obtained when the channels depth *d* is exactly $\lambda g/4$. Thus it is possible to use pseudo-cavity region 35 to constrain energy at several closely related frequencies.

In another embodiment of the inventive waveguide structure (not illustrated), a second pair of channels may extend from the top and bottom of waveguide 20 to form a second pseudo-cavity region surrounding the first pseudo-cavity region. This second region then may function to constrain any residual energy not completely contained by the first, smaller pseudo-cavity. In yet another embodiment, two adjacent pseudo-cavity regions may be formed in the same waveguide. If appropriate care is taken to prevent excitation of spurious modes, the side grooves of one pseudo-cavity simultaneously may be used as the side grooves of the adjacent channel, even though the two adjacent regions are of different size.

Further, it will be understood that various other modifications may be made to waveguide structure 20 within the spirit and scope of this invention. For example, although FIGS. 1 and 2 illustrate channels 30*a* and 30*b* as terminating against wall 24, this is not required. Rather channel sections 30*a* and 30*b* may be separated some distance from wall 24 and include yet another groove to form substantially rectangular shaped channels. These channels then will define a rectangular pseudo-cavity region within the main waveguide 20, into which region energy may be introduced, e.g., by way of a coaxial waveguide introduced through top 21 and bottom 22. Alternately, it may be possible to form pseudo-cavity region 35 using only one channel, extending either from top 21 or bottom 22. Such a configuration would provide somewhat less energy containment than the opposing channel embodiments illustrated, but may be advantageous in certain applications where it is impractical to prepare grooves in one waveguide wall.

The characteristics descibed hereinabove indicate that the waveguide structure illustrated by FIGS. 1 and 2 is well suited for application in a microwave parametric amplifier capable of broadband operation in the non-degenerate operational mode.

The theory of parametric amplification has been described widely in the literature, as for example, in the textbook entitled "Coupled Mode and Parametric Electronics" by William H. Louisell, published in 1960 by John Wiley and Sons, New York. Basically, parametric amplification involves the mixing of a signal at frequency $\omega_s = 2\pi f_s$ with an intense energy source called a pump having a frequency $\omega_p$. (In the following discussion, the term "frequency" will be used to denote the circular frequency $\omega = 2\pi f$, where $f$ is the frequency of interest). When combined in the presence of a nonlinear reactance (e.g., a varactor diode) energy is coupled between the pump and the signal. The interaction also gives rise to energy at two additional frequencies $\omega_{i1} = \omega_p - \omega_s$ and $\omega_{i2} = \omega_p + \omega_s$; these are called idlers. Non-degenerate parametrc operation occurs when $\omega_p$ is not equal to $2\omega_s$.

Figure 5:
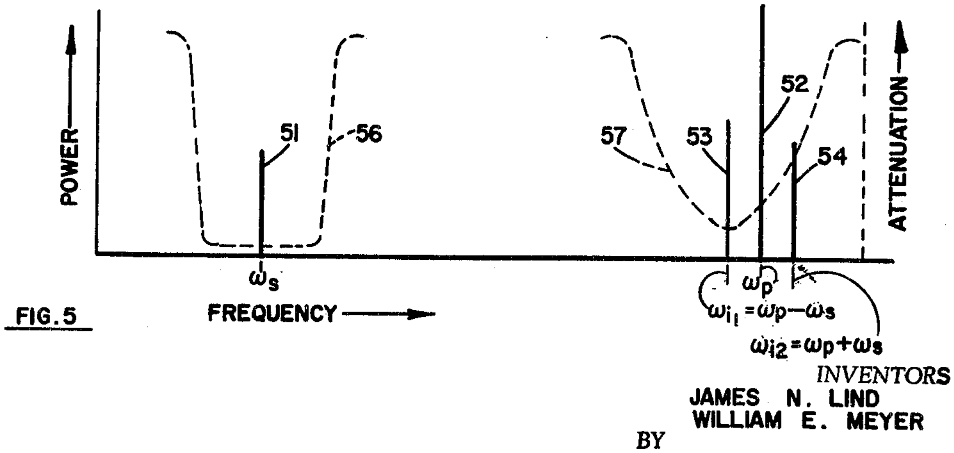
FIG. 5 is a graph showing the operational mode spectrum of the inventive broadband parametric amplifier.

FIG. 5 is a graph illustrating a parametric operational mode spectrum; the inventive wideband parametric amplifier may be operated in the corresponding mode. As indicated in FIG. 5, solid vertical line 51 represents the power present at signal frequency $\omega_s$, the center frequency of the amplifier passband. Similarly, line 52 represents the power present in the pump wave at frequency $\omega_p$. Lines 53 and 54 respectively represent the power which will be present at the idler frequencies $\omega_{i1}$ and $\omega_{i2}$ when parametric interaction occurs.

For optimum wideband parametric amplification with nearly constant gain across the band of interest, it is desirable to use an input bandpass filter to define the bandwidth of the signal to be amplified. Further, it is desirable to have extreme separation between frequencies $\omega_s$ and $\omega_p$. The theoretical considerations on which these factors are based are described in the article by George Matthaei, entitled "A Study of the Optimum Design of Wide-Band Parametric Amplifiers and Up-Converters," published in the IRE Transactions on Microwave Theory and Techniques, volume MTT-9, No. 1, January 1961, pages 23–38.

As shown superimposed on the operational mode spectrum of FIG. 5, dashed curve 56 illustrates the preferred attenuation characteristics of an input bandpass filter which may be used as a component of the inventive wideband parametric amplifier. Note that the passband region is centered around frequency $\omega_s$ and that the width of the passband defines the bandwidth of the amplifier. Note also in FIG. 5 that frequency $\omega_p$ is widely separated from $\omega_s$. For example, if $\omega$ is selected to be 9 gHz. and the passband of attenuation curve 56 is selected to extend from 8 gHz. to 10 gHz., then $\omega_p$ may be selected to be a frequency of 94 gHz. In this example, the idler frequencies will be $\omega_{i1} = 85$ gHz.$\pm 1$ gHz. and $\omega_{i2} = 103$ gHz.$\pm 1$ gHz. Of course, it is to be understood that these frequencies are cited by way of example only, and that the parametric amplifier described herein may be operated at other frequencies as well.)

Figure 6:
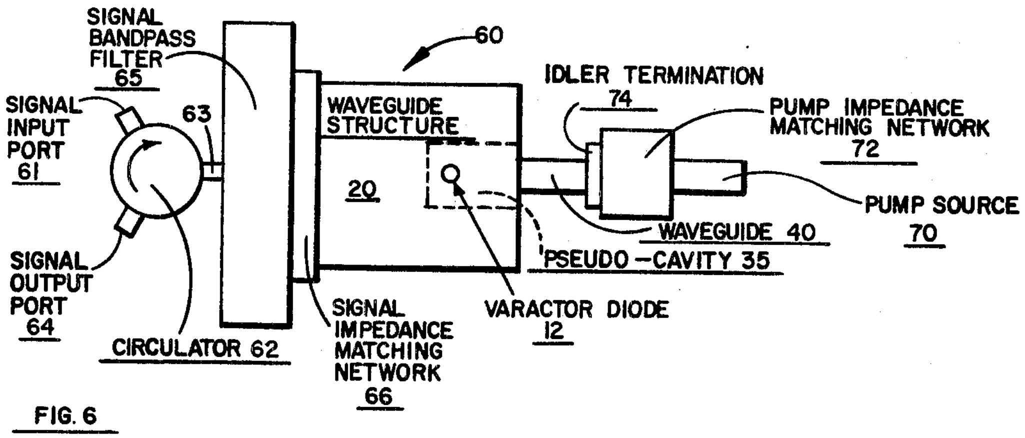
FIG. 6 is a block diagram of the inventive broadband parametric amplifier utilizing the waveguide structure illustrated in FIGS. 1 and 2.

A block diagram of the broadband parametric amplifier 60 utilizing the inventive waveguide structure is shown in FIG. 6; parametric interaction occurs is pseudo-cavity region 35, in which region varactor diode 12 is located. The characteristics of the waveguide structure have been described hereinabove in conjunction with FIGS. 1 and 2. In a preferred embodiment, the depth $d$ of channels 30*a* and 30*b* is selected to equal one-quarter guide wavelength at the lower idler frequency $\omega_{i1}$. Since the pump and upper idler frequencies ($\omega_p$ and $\omega_{i2}$ respectively) are not far removed from lower idler frequency $\omega_{i1}$, energy at these frequencies also will be constrained to within pseudo-cavity region 35, but to a slightly lesser degree. This characteristic is illustrated by curve 57 in FIG. 5 which represents the "passband" of pseudo-cavity region 35. Note that at frequencies $\omega_p$ and $\omega_{i2}$, pseudo-cavity region 35 will present a slightly reactive load as viewed from waveguide 40.

The signal to be amplified is introduced into parametric amplifier 60 by way of signal input port 61 in microwave circulator 60. Microwave circulator 62 is of a type well known to those skilled in the art, and functions to allow a signal introduced through input port 61 to exit via common port 63 while insuring that a signal which enters via port 63 will leave circulator 62 via output port 64.

The signal to be amplified enters signal bandpass filter 65 from circulator common port 63. Signal bandpass filter 65, well known to those skilled in the art, may be of the type described, e.g., in chapter 9 of the book entitled "Microwave Filters, Impedance Matching Networks, and Coupling Structures" by George Matthaei et al., McGraw-Hill Book Company, 1964. In a preferred embodiment, signal bandpass filter 65 will exhibit the attenuation characteristics described generally by curve 56 in FIG. 5. That is, filter 65 will have minimum attenuation within the desired passband, and high attenuation at all other frequencies.

The signal from bandpass filter 65 next passes through signal impedance matching network 66, which functions to match the input signal to the small inductive perturbation which it will see in waveguide 20 as a result of the presence of pseudo-cavity region 35. Impedance matching network 66 also serves to introduce the signal into waveguide 20 in a particular mode, e.g., in the $TE_{10}$ mode, the lowest mode which can be supported by waveguide structure 20. The design of impedance matching network 66 is well known to those skilled in the art, and is described for example in chapter 6 of the book "Microwave Filters, Impedance-Matching Networks, and Coupling Structures," referenced above. In a preferred embodiment, waveguide structure 20 will have a width $a$ (see FIG. 1) which is one-half free space wavelength at the lowest frequency of the signal passband. This will allow the signal to be introduced into waveguide structure 20 in the $TE_{10}$ mode.

Pump energy may be supplied from pump source 70 which in a preferred embodiment may comprise a reflex klystron oscillator and a microwave isolator, both operating at the pump frequency $\omega_p$. These components are well known to those skilled in the art. Energy from pump source 70 passes through pump impedance matching network 72, upper idler termination 74, and waveguide 40 into pseudo-cavity region 35. The function of impedance matching network 72 is to match the pump wave to the reactance exhibited by pseudo-cavity region 35 at the pump frequency. Network 72 performs the further function of ensuring that the pump energy is introduced into pseudo-cavity region 35 in an appropriate mode (e.g., the $TE_{303}$ mode illustrated in FIGS. 3 and 4) to ensure that the pump electric field will be a maxima at the location of varactor diode 12.

In a preferred embodiment, the width $a'$ of waveguide 40 is selected to provide a cutoff frequency between lower idler frequency $\omega_{i1}$ and pump frequency $\omega_p$. Further, waveguide 40 should be sufficiently long so that pump impedance matching network 72 does not interact with energy at lower idler frequency $\omega_{i1}$. In a typical embodiment, a waveguide 40 length which will ensure 20 db attenuation at idler frequency $\omega_{i1}$ is sufficient for satisfactory operation. These considerations will allow pump energy from pump source 70 to be introduced into pseudo-cavity region 35 via waveguide 40, but will prevent energy at the lower idler frequency $\omega_{i1}$ from exiting pseudo-cavity region 35 via waveguide 40. In effect, this will completely constrain energy at the lower idler frequency $\omega_{i1}$ to within pseudo-cavity region 35. Upper idler termination 74 is a reactive trap which functions to reflect energy at the upper idler frequency $\omega_{i2}$ (which energy will propagate through waveguide 40) back into pseudo-cavity region 35.

With the parametric amplifier illustrated in FIG. 6, when a signal and a pump are introduced into waveguide structure 10, parametric amplification will occur and the amplified signal may be extracted via impedance matching networks 66, signal bandpass filter 65, circulator common port 63, circulator 62, and signal output port 64. The bandwidth of the amplifier will be defined by the passband of signal bandpass filter 65 (see curve 56 of FIG. 5).

It will be apparent that the inventive waveguide structure described in conjunction with FIGS. 1 and 2 is not limited to use in a broadband parametric amplifier, and may be employed in various other microwave devices. Moreover, while the invention has been described and illustrated in detail, it is to be clearly understood that the same is by way of illustration and example only, and is not to be taken by way of limitation.

We claim:

1. In a microwave parametric amplifier of the type comprising a circulator, a pump source, and a varactor diode, that improvement comprising a waveguide having a lowest propagation frequency, means for constraining energy having a second frequency higher than said lowest propagation frequency to within a pseudo-cavity region of said waveguide, said means comprising a pair of channels oppositely extending from the top and bottom of said waveguide, said channels having a depth of essentially one-quarter wavelength of said second frequency, the thickness of said channels is no greater than the depth of said channels, means for introducing energy into said pseudo-cavity region, said means comprising a second waveguide extending from one wall of said waveguide and having a cutoff frequency higher than said lowest propagation frequency, said varactor diode is disposed in said pseudo-cavity region, wherein a signal is introduced into said waveguide via said circulator at said lowest propagation frequency, and wherein energy from said pump source is introduced into said pseudo-cavity region via said second waveguide.

2. A non-degenerate microwave parametric amplifier for coupling energy from a pump to a signal, comprising, in combination a structure comprising (a) a first rectangular waveguide, one end of said first waveguide terminating in a second waveguide having a cutoff frequency higher than the cutoff frequency of said first waveguide (b) a pair of substantially U-shaped channels oppositely extending from the top and bottom of said first waveguide, the depth of said channels being one-quarter guide wavelength at the difference frequency between said signal and said pump, said channels and said terminating end defining a pseudo-cavity region within said first waveguide and (c) a varactor diode disposed within said pseudo-cavity region, first means for introducing said signal into said first waveguide, and, second means for introducing said pump into said pseudo-cavity region via said second waveguide.

3. A parametric amplifier as defined in claim 2 wherein said first means comprises a circulator having an input port through which a signal may be introduced, an output port through which an amplified signal may be extracted, and a common port, and a bandpass filter operatively connecting said circulator common port and said first waveguide, for permitting signal energy within the passband of said filter to pass between said circulator and said structure.

4. An amplifier as defined in claim 3 further comprising impedance matching means, operatively connecting said bandpass filter and said first waveguide, for matching the impedance of said filter to the impedance of said structure.

5. An amplifier as defined in claim 3 wherein said second means comprises a source of pump energy, and impedance matching means, operatively connecting said source and said second waveguide, for introducing energy from said source into said pseudo-cavity region in a mode appropriate for coupling to said diode.

6. An amplifier as defined in claim 5 wherein said channels have a thickness no greater than their depth, wherein said pseudo-cavity region has a length of one and one-quarter guide wavelength at said difference frequency and a width of one guide wavelength at said difference frequency, and wherein said cutoff frequency of said second waveguide is higher than said difference frequency and lower than said pump frequency.

7. An amplifier as defined in claim 6 wherein said diode is located three-quarters guide wavelength from said terminating end and one-half guide wavelength from each side groove of said channel.

No reference cited.

ROY LAKE, Primary Examiner

D. R. HOSTETTER, Assistant Examiner

U.S. Cl. X.R.

330—56; 333—83